(12) United States Patent
Nam et al.

(10) Patent No.: US 12,434,678 B2
(45) Date of Patent: Oct. 7, 2025

(54) BRAKING SYSTEM AND BRAKING METHOD USING THE SAME

(71) Applicants: Hyundai Motor Company, Seoul (KR); Kia Corporation, Seoul (KR)

(72) Inventors: Ho Jung Nam, Suwon-Si (KR); Joo Beom Kim, Gwacheon-Si (KR); Jun Ho Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 532 days.

(21) Appl. No.: 18/096,411

(22) Filed: Jan. 12, 2023

(65) Prior Publication Data
US 2024/0101088 A1 Mar. 28, 2024

(30) Foreign Application Priority Data
Sep. 26, 2022 (KR) .......... 10-2022-0122000

(51) Int. Cl.
| | |
|---|---|
| *B60T 8/94* | (2006.01) |
| *B60T 7/22* | (2006.01) |
| *B60T 13/14* | (2006.01) |
| *B60T 13/58* | (2006.01) |
| *B60T 13/68* | (2006.01) |

(Continued)

(52) U.S. Cl.
CPC .............. *B60T 8/94* (2013.01); *B60T 7/22* (2013.01); *B60T 13/148* (2013.01); *B60T 13/58* (2013.01); *B60T 13/686* (2013.01); *B60T 13/74* (2013.01); *B60T 17/22* (2013.01); *B60T 2210/32* (2013.01); *B60T 2250/04* (2013.01); *B60T 2270/402* (2013.01); *B60T 2270/406* (2013.01); *B60T 2270/413* (2013.01)

(58) Field of Classification Search
CPC ........ B60T 8/94; B60T 13/588; B60T 13/667; B60T 13/686; B60T 13/748; B60T 2270/40; B60T 2270/402; B60T 2270/406; B60T 2270/413
USPC ............................................. 701/70
See application file for complete search history.

(56) References Cited

U.S. PATENT DOCUMENTS

| | | |
|---|---|---|
| 10,737,675 B2 | 8/2020 | Witte et al. |
| 2017/0341634 A1 | 11/2017 | Heise |

(Continued)

FOREIGN PATENT DOCUMENTS

| | | |
|---|---|---|
| JP | 2007 45234 A | 2/2007 |
| KR | 10 1961582 B1 | 3/2019 |

(Continued)

*Primary Examiner* — Erick R Solis
(74) *Attorney, Agent, or Firm* — Morgan, Lewis & Bockius LLP

(57) ABSTRACT

A braking system includes a hydraulic brake including a first hydraulic brake provided on one of a front wheel and a rear wheel of a vehicle and a second hydraulic brake provided on the other of the front wheel and the rear wheel of the vehicle, a main braking force adjusting device configured to control braking hydraulic pressure supplied to the first hydraulic brake and the second hydraulic brake, and an auxiliary braking force adjusting device configured to directly control braking hydraulic pressure of the first hydraulic brake when a failure occurs in the main braking force adjusting device, wherein the first hydraulic brake is connected to the main braking force adjusting device via the auxiliary braking force adjusting device.

22 Claims, 8 Drawing Sheets

(51) Int. Cl.
*B60T 13/74* (2006.01)
*B60T 17/22* (2006.01)

(56) References Cited

U.S. PATENT DOCUMENTS

| | | | |
|---|---|---|---|
| 2019/0100218 A1* | 4/2019 | Kim | B60T 13/686 |
| 2020/0331442 A1* | 10/2020 | Cheon | B60T 7/042 |
| 2021/0009095 A1* | 1/2021 | Kim | B60W 10/184 |
| 2021/0171062 A1 | 6/2021 | Hecker et al. | |
| 2022/0055592 A1* | 2/2022 | Leiber | B60T 13/00 |

FOREIGN PATENT DOCUMENTS

| | | |
|---|---|---|
| KR | 10 2184483 B1 | 12/2020 |
| KR | 10 2021 0007510 A | 1/2021 |
| KR | 10 2021 0 0 89274 A | 7/2021 |
| KR | 10 2308679 B1 | 10/2021 |

\* cited by examiner

BRAKING SYSTEM AND BRAKING METHOD USING THE SAME

CROSS-REFERENCE TO RELATED APPLICATIONS

The present application claims priority to Korean Patent Application No. 10-2022-0122000 filed on Sep. 26, 2022, the entire contents of which is incorporated herein for all purposes by this reference.

BACKGROUND OF THE PRESENT DISCLOSURE

Field of the Present Disclosure

The present disclosure relates to a braking system and a braking method using the same.

Description of Related Art

A brake may be a device for reducing a speed of a vehicle or stopping the vehicle while the vehicle is travelling, and may be the most important device for vehicle safety. A vehicle brake may reduce a speed of a vehicle and stop the vehicle by converting rotational energy of a tire wheel into thermal energy using frictional force.

A brake of a vehicle may be directly related to driver's safety, and when a failure occurs in a brake control unit of a vehicle, the vehicle may not operate normally, and the vehicle may need to be stopped using auxiliary braking means such as an engine brake for safety.

Accordingly, there has been demand for a device which may, even when the main braking force adjusting device of the vehicle fails, control braking force of the vehicle instead of a main braking force adjusting device and may allow the vehicle to continuously operate safely without stopping the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a braking system and a braking method which may control braking using an auxiliary braking force adjusting device even when a failure occurs in a main braking force adjusting device.

An aspect of the present disclosure is to provide a braking system and a braking method which may control braking while maintaining an operating vehicle even when a failure occurs in a main braking force adjusting device.

According to an aspect of the present disclosure, a braking system includes a hydraulic brake including a first hydraulic brake provided on one of a front wheel and a rear wheel of a vehicle and a second hydraulic brake provided on the other of the front wheel and the rear wheel of the vehicle, a main braking force adjusting device configured to control braking hydraulic pressure supplied to the first hydraulic brake and the second hydraulic brake, and an auxiliary braking force adjusting device configured to directly control braking hydraulic pressure of the first hydraulic brake when a failure occurs in the main braking force adjusting device, wherein the first hydraulic brake is connected to the main braking force adjusting device via the auxiliary braking force adjusting device.

The auxiliary braking force adjusting device may electrically control braking of a wheel provided with the second hydraulic brake.

The auxiliary braking force adjusting device may electrically control braking of a wheel provided with the second hydraulic brake using an electronic parking brake (EPB).

The auxiliary braking force adjusting device may control the EPB through a redundancy mode, and the redundancy mode is a mode in which a vehicle travels while maintaining the EPB in a pre-operating state for a predetermined time period.

The auxiliary braking force adjusting device may include a first redundancy hydraulic line connected to the first hydraulic brake, and a brake oil supply line supplied with brake oil.

The auxiliary braking force adjusting device may further include a redundant hydraulic motor pump configured to adjust braking hydraulic pressure supplied to the first redundancy hydraulic line.

The first hydraulic brake may include a hydraulic brake of a left wheel and a hydraulic brake of a right wheel, and the auxiliary braking force adjusting device individually may adjust hydraulic pressure of the hydraulic brake of the left wheel and the hydraulic brake of the right wheel.

The auxiliary braking force adjusting device may further include a main hydraulic line connected to the main braking force adjusting device, and the auxiliary braking force adjusting device includes a main shut-off valve configured to connect or block braking hydraulic pressure transferred from the main hydraulic line.

The main braking force adjusting device and the auxiliary braking force adjusting device may be connected to each other via a first failure confirmation line, which is a communication line for identifying whether the braking force adjusting device operates normally, and a second failure confirmation line, which is a line directly connecting the main braking force adjusting device to the auxiliary braking force adjusting device and applying a predetermined voltage from the main braking force adjusting device to the auxiliary braking force adjusting device.

Braking may be controlled through the auxiliary braking force adjusting device when the failure of the main braking force adjusting device is confirmed through one of the first and second failure confirmation lines.

According to another aspect of the present disclosure, a braking method includes determining whether a failure occurs in a main braking force adjusting device configured to control braking hydraulic pressure of a first hydraulic brake provided on one of a front wheel and a rear wheel of a vehicle and a second hydraulic brake provided on another of the front wheel and the rear wheel of the vehicle, and performing a redundancy braking control of directly controlling braking hydraulic pressure of the first hydraulic brake through an auxiliary braking force adjusting device when the failure occurs in the main braking force adjusting device, wherein the first hydraulic brake is connected to the main braking force adjusting device via the auxiliary braking force adjusting device.

The performing the redundancy braking control may further include electrically controlling braking of a wheel provided with the second hydraulic brake by the auxiliary braking force adjusting device when a target braking force exceeds a first redundant braking force, and the target braking force may be required to decelerate a vehicle at a predetermined deceleration amount, and the first redundant braking force may be generated by the auxiliary braking force adjusting device using the first hydraulic brake.

The performing the redundancy braking control may include maintaining the vehicle to travel while directly controlling braking hydraulic pressure of the first hydraulic brake through the auxiliary braking force adjusting device, electrically controlling braking of a wheel provided with the second hydraulic brake, and controlling braking force of the vehicle even when a failure occurs in the main braking force adjusting device.

The electrically controlling braking of the wheel provided with the second hydraulic brake may include performing braking by the auxiliary braking force adjusting device using an EPB of the wheel provided with the second hydraulic brake.

The electrically controlling braking of the wheel provided with the second hydraulic brake may include a first EPB redundancy mode in which the braking is performed using the EPB, and in the first EPB redundancy mode, the vehicle travels while maintaining the EPB in a pre-operating state for a predetermined time period.

The electrically controlling braking of the wheel provided with the second hydraulic brake may include determining a risk level through an autonomous driving control unit, and performing a second EPB redundancy mode for controlling braking using the EPB according to the risk level.

The performing the second EPB redundancy mode according to the risk level may include applying a pre-operating time of the EPB differently according to the risk level.

The determining the risk level may include determining a risk level based on at least a portion of whether controlling hydraulic braking is performed, a distance to an obstacle, and a speed of the vehicle.

The determining the risk level may include determining a risk level using a table generated based on a distance to an obstacle and a speed of the vehicle.

The determining whether a failure occurs in the main braking force adjusting device may include determining that the failure has occurred by the main braking force adjusting device when the failure of the main braking force adjusting device is confirmed through at least one of a first failure confirmation line and a second failure confirmation line, wherein the first failure confirmation line may be a communication line configured to identify whether the main braking force adjusting device is operating normally, and the second failure confirmation line may be a line through which a predetermined voltage is applied from the main braking force adjusting device to the auxiliary braking force adjusting device.

According to another aspect of the present disclosure, a braking method includes determining whether a failure occurs in a main braking force adjusting device configured to control a first brake provided on one of front and rear wheels of a vehicle and a second brake provided on another of the front and rear wheels of the vehicle, and travelling while controlling braking by an auxiliary braking force adjusting device using an electronic brake of a wheel provided with at least a second brake when a failure occurs in the main braking force adjusting device, wherein the travelling while controlling braking using the electronic brake includes travelling in a state in which the electronic brake pre-operates for a predetermined time period.

The electronic brake may be an electronic parking brake (EPB).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
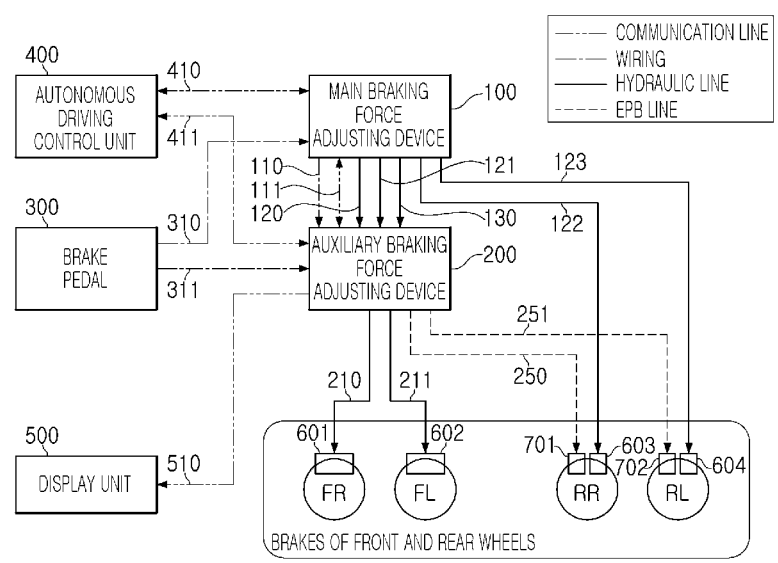
FIG. 1 is a block diagram illustrating a braking system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described with reference to the appended drawings.

Elements having the same function in the scope of the same concept represented in the drawings of various exemplary embodiments will be described using the same reference numeral.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the embodiments The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a braking system 10 according to an exemplary embodiment of the present disclosure.

Referring to FIG. 1, the braking system 10 may include a main braking force adjusting device 100 and an auxiliary braking force adjusting device 200.

The main braking force adjusting device 100 may receive a signal regarding stroke of the brake pedal reflecting a user's intention to brake, and may perform braking by controlling braking hydraulic pressure of the front and rear wheels of the vehicle. Here, the main braking force adjusting device may adjust braking hydraulic pressure based on information such as an adjusting amount and an adjusting speed of the brake pedal through a sensor attached to the brake pedal. The main braking force adjusting device 100 may be an integrated electrical booster, but an exemplary embodiment thereof is not limited thereto.

Also, the main braking force adjusting device 100 may include first to fourth main hydraulic lines 120, 121, 122, and 123 connected to the front and rear wheels of the vehicle. The main hydraulic lines 120, 121, 122, and 123 may be connected to hydraulic brakes 601, 602, 603, and 604 provided on the left and right sides of the front wheel and the left and right sides of the rear wheel of the vehicle, respectively. Here, the hydraulic brakes 601, 602, 603, and 604 may generate braking force by controlling a brake disc or a brake drum through hydraulic pressure.

The main braking force adjusting device 100 may be connected to the hydraulic brakes 601, 602, 603, and 604 via the auxiliary braking force adjusting device 200. Referring to FIG. 1, the main braking force adjusting device 100 may be connected to the auxiliary braking force adjusting device 200 through the first main hydraulic line 120 and the second main hydraulic line 121, and the auxiliary braking force adjusting device 200 may be connected to the hydraulic brakes 601 and 602 on the left and right sides of the front wheels through the first redundancy hydraulic lines 210 and 211. The first main hydraulic pressure line 120 of the main braking force adjusting device 100 may be connected to the hydraulic brake 601 on the right side of the front wheel through the first redundancy hydraulic line 210 of the auxiliary braking force adjusting device 200. The second main hydraulic line 121 of the main braking force adjusting device 100 may be connected to the hydraulic brake 602 on the left side of the front wheel through the first redundancy hydraulic line 211 of the auxiliary braking force adjusting device 200. Also, the main braking force adjusting device 100 may be connected to the hydraulic brake 603 on the right side of the rear wheel through the third main hydraulic line 122, and may be connected to the hydraulic brake 604 on the left side of the rear wheel through the fourth main hydraulic line 123.

Here, the main braking force adjusting device 100 may be connected via the hydraulic brakes 601 and 602 of the front wheels and the auxiliary braking force adjusting device 200, but an exemplary embodiment thereof is not limited thereto, and the main braking force adjusting device 100 may be connected to the hydraulic brakes 603 and 604 of the rear wheels via the auxiliary braking force adjusting device 200. The main braking force adjusting device 100 and the auxiliary braking force adjusting device 200 are not limited to a specific connection structure. In the instant case, the hydraulic brakes 601 and 602 of the front wheels may be directly connected to the main braking force adjusting device 100. Here, hydraulic brakes connected via the main braking force adjusting device 100 and the auxiliary braking force adjusting device 200 may be referred to as first hydraulic brakes 601 and 602, and hydraulic brakes directly connected to the main braking force adjusting device 100 may be referred to as second hydraulic brakes 603 and 604.

The auxiliary braking force adjusting device 200 may determine whether the main braking force adjusting device 100 is faulty, and when a failure occurs in the main braking force adjusting device 100, the auxiliary braking force adjusting device 200 may replace the main braking force adjusting device 100 and may control braking force of the vehicle. The auxiliary braking force adjusting device 200 may be connected to the first hydraulic brakes 601 and 602 through the first redundancy hydraulic lines 210 and 211, and may generate braking force by controlling braking hydraulic pressure of the first hydraulic brakes 601 and 602.

Also, the auxiliary braking force adjusting device 200 may control the wheel provided with the second hydraulic brake 503 and 504, not connected via the hydraulic line, using electronically connected brakes. Here, the electronically connected brakes may be electronic parking brakes (EPB) 701 and 702. The auxiliary braking force adjusting device 200 may be connected to the right side of the rear wheel and the first EPB control line 250, and may be connected to the left side of the rear wheel and the second EPB control line 251. The auxiliary braking force adjusting device 200 may generate braking force by controlling the first EPB 701 and the second EPB 702 provided on the rear wheels through the first EPB control line 250 and the second EPB control line 251.

The auxiliary braking force adjusting device 200 may receive a stroke signal of the brake pedal reflecting a user's intention to brake and may control the first hydraulic brakes 601 and 602 to generate braking force. The auxiliary braking force adjusting device 200 may adjust braking hydraulic pressure based on information such as an adjusting amount and an adjusting speed of the brake pedal through a sensor attached to the brake pedal 300.

Here, the brake pedal 300 may be connected to the main braking force adjusting device 100 through the first stroke transmission line 310, and may be connected to the auxiliary braking force adjusting device 200 through the second stroke transmission line 311. Each may be connected. When the main braking force adjusting device 100 is operating normally, information such as the adjusting amount and the adjusting speed of the brake pedal 300 may be transmitted to the main braking force adjusting device 100 through the first stroke transmission line 310. Conversely, when a failure occurs in the main braking force adjusting device 100, information such as an adjusting amount and an adjusting speed of the brake pedal 300 may be transmitted to the auxiliary braking force adjusting device 200 through the second stroke transmission line 311. Accordingly, even when a failure occurs in the main braking force adjusting device 100, the auxiliary braking force adjusting device 200 may receive a user's intention to brake based on the information such as the adjusting amount and the adjusting speed of the brake pedal 300 and may control braking force.

Also, the auxiliary braking force adjusting device 200 may be connected to the main braking force adjusting device 100 and the braking oil supply line 130. The auxiliary braking force adjusting device 200 may receive braking oil for generating hydraulic pressure through a braking oil supply line 130, and may control hydraulic pressure through the line. The brake oil supply line 130 may be a branched line from a brake oil reservoir tank included in the main braking force adjusting device 100, and may be a line for supplying brake oil to the auxiliary braking force adjusting device 200. However, an exemplary embodiment thereof is not limited thereto, and a brake oil reservoir tank for supplying brake oil to the auxiliary braking force adjusting device 200 may be provided.

The braking system 10 may further include an autonomous driving control unit 400 and a display unit 500. The autonomous driving control unit 400 may detect driving situation of the vehicle or the situation of the road on which the vehicle is travelling, and may control the vehicle to accelerate, decelerate, and stop using the main braking force adjusting device 100 or the auxiliary braking force adjusting device 200. The autonomous driving control unit 400 may be connected to the main braking force adjusting device 100 through the first autonomous driving control line 410, and may be connected to the auxiliary braking force adjusting device 200 through the second autonomous driving control line 411. Accordingly, when the main braking force adjusting device 100 is operating normally, the autonomous driving control unit 400 may perform autonomously driving while exchanging information with the main braking force adjusting device 100 and the first autonomous driving control line 410. Also, even when a failure occurs in the main braking force adjusting device 100, the autonomous driving control unit 400 may perform autonomous driving while exchanging information through the auxiliary braking force adjusting device 200 and the second autonomous driving control line 411.

The autonomous driving control unit 400 may be a highway driving pilot (HDP), but an exemplary embodiment thereof is not limited thereto, and may be a device configured for controlling a vehicle without a driver's control. The autonomous driving control unit 400 may determine a risk level of an operating vehicle according to a request from the auxiliary braking force adjusting device 200, and may transmit the determined risk level to the auxiliary braking force adjusting device 200. Meanwhile, the braking system 10 may be operated even when the autonomous driving control unit 400 is not provided.

The display unit 500 may provide information on the current braking control state to a driver. The display unit 500 may include a visual display unit and an auditory display unit. The visual display unit may include a cluster including a display of the vehicle. The auditory display unit may include audio devices of a vehicle. The auxiliary braking force adjusting device 200 may be connected to the display unit 500 through a display unit line 510, and may transmit information on the state of the vehicle to the user through the display unit 500.

Figure 2:
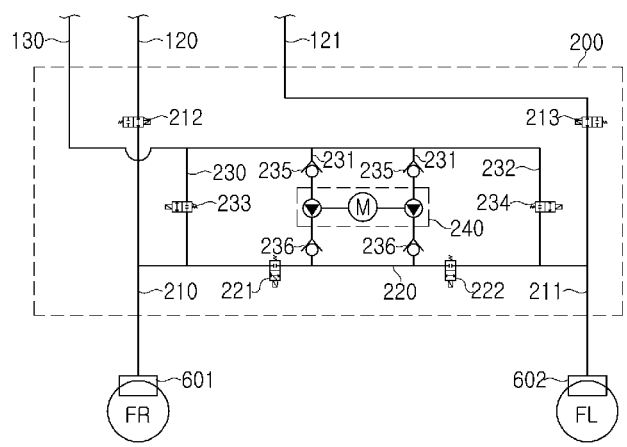
FIG. 2 is a circuit diagram illustrating hydraulic pressure of an auxiliary braking force adjusting device according to an exemplary embodiment of the present disclosure.

FIG. 2 is a circuit diagram illustrating hydraulic pressure of an auxiliary braking force adjusting device 200 according to an exemplary embodiment of the present disclosure.

The auxiliary braking force adjusting device 200 may be configured to perform braking control by replacing the main braking force adjusting device 100 when a failure occurs in the main braking force adjusting device 100. The auxiliary braking force adjusting device 200 may replace the main braking force adjusting device 100 and may control braking hydraulic pressure of the first hydraulic brakes 601 and 602. The auxiliary braking force adjusting device 200 may include first redundancy hydraulic lines 210 and 211, second redundancy hydraulic lines 220, third redundancy hydraulic lines 230, 231, and 232, and a redundant hydraulic motor pump 240.

One end portion of the first redundancy hydraulic line 210 and 211 may be coupled to the first and second main hydraulic lines 120 and 121 connected to the main braking force adjusting device 100, and the other end portion may be coupled to the hydraulic brakes 601 and 602. Here, one end portion of the first redundancy hydraulic lines 210 and 211 may be coupled to the main hydraulic lines 120 and 121 through main shut-off valves 212 and 213.

The second redundancy hydraulic line 220 may be branched from a pair of first redundancy hydraulic lines 210 and 211 connected to brakes on the left and right sides of the first hydraulic brakes 601 and 602, respectively, and may connect the devices.

The third redundancy hydraulic line 230, 231, and 232 may be one or more hydraulic lines branched from the second redundancy hydraulic line 220. A redundancy hydraulic motor pump 240 may be disposed in two lines 231 of the third hydraulic line, and check valves 235 and 236 for preventing a backflow before and after the redundancy hydraulic motor pump 240 may be provided. The third redundancy hydraulic lines 230, 231, and 232 may be connected to the braking oil supply line 130, and the redundancy hydraulic motor pump 240 may receive braking oil through the braking oil supply line 130 and may supply hydraulic pressure to the first hydraulic brakes 601 and 602. Here, the braking oil supply line 130 may supply braking oil for generating hydraulic pressure to the auxiliary braking force adjusting device 200. Accordingly, the auxiliary braking force adjusting device 200 may adjust hydraulic pressure of the first hydraulic brake without the main braking force adjusting device 100.

The redundancy hydraulic motor pump 240 may include one hydraulic motor and two hydraulic pumps, and may control pressure of braking oil supplied from the braking oil supply line 130, and hydraulic pressure transmitted to the first hydraulic brakes 601 and 602 through the first redundancy hydraulic lines 210 and 211 may be adjusted. The second redundancy hydraulic line 220 and the third redundancy hydraulic line 230, 231, and 232 may include a plurality of valves 221, 222, 233, and 234, and independent hydraulic pressure may be transmitted to the first redundancy hydraulic lines 210 and 211 disposed on both end portions of the second redundancy hydraulic line 220, respectively. Accordingly, attitude control of the vehicle may be performed by adjusting braking force generated from each of the left or right wheels of the vehicle even through the auxiliary braking force adjusting device 200.

Also, the first redundancy hydraulic lines 210 and 211 may be connected to the first main hydraulic line 120 and the second main hydraulic line 121, respectively, through the first main shut-off valve 212 and the second main shut-off valve 213. When it is determined that the first main shut-off valve 212 and the second main shut-off valve 213 have a failure in the main braking force adjusting device 100, hydraulic pressure supplied to the first hydraulic brakes 601 and 602 through the first main hydraulic line 120 and the second main hydraulic line 121 may be blocked. In the instant case, the auxiliary braking force adjusting device 200 may receive braking oil through the braking oil supply line 130 instead of the blocked main braking force adjusting device 100, and may independently control hydraulic pressure supplied to the first hydraulic brakes 601 and 602.

Figure 3A:
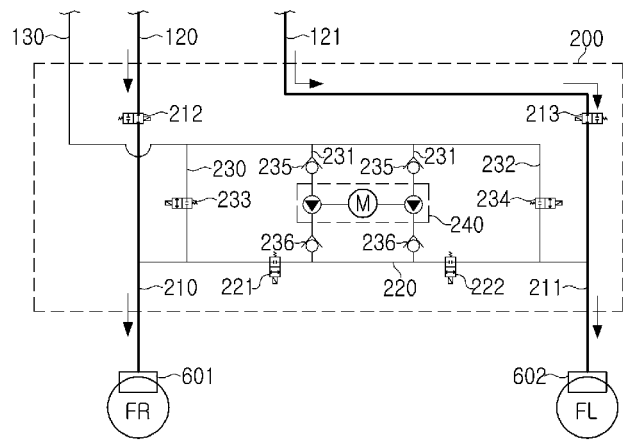
FIG. 3A is a diagram illustrating a flow of braking hydraulic pressure in a state in which a main braking force adjusting device is in a normal state according to an exemplary embodiment of the present disclosure.
Figure 3B:
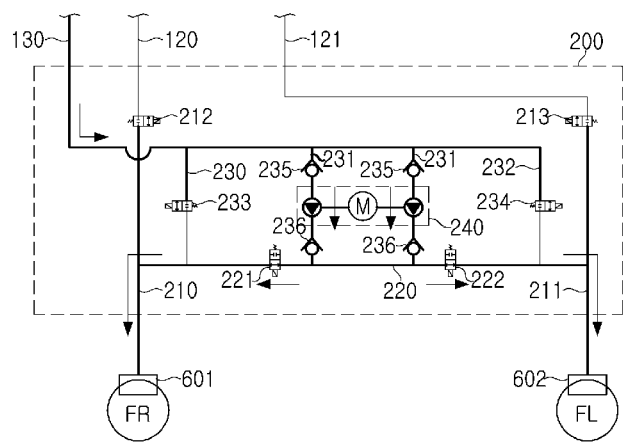
FIG. 3B is a diagram illustrating a flow of supplying braking hydraulic pressure in a state in which a failure occurs in a main braking force adjusting device according to an exemplary embodiment of the present disclosure.
Figure 3C:
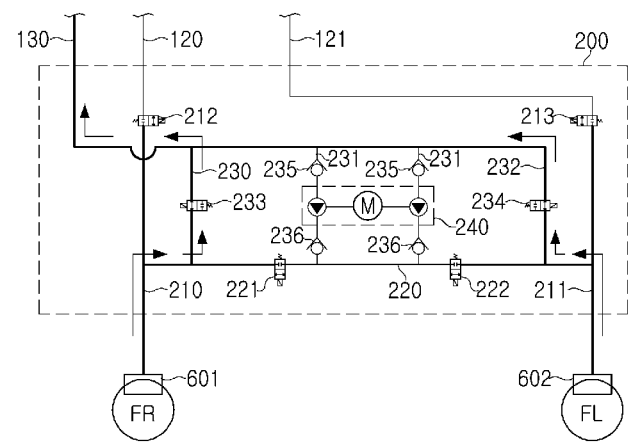
FIG. 3C is a diagram illustrating a flow of releasing a braking hydraulic pressure in a state in which a failure occurs in a main braking force adjusting device according to an exemplary embodiment of the present disclosure.

FIG. 3A is a diagram illustrating a flow of braking hydraulic pressure in a state in which a main braking force adjusting device 100 is in a normal state according to an exemplary embodiment of the present disclosure. FIG. 3B is a diagram illustrating a flow of supplying braking hydraulic pressure in a state in which a failure occurs in a main braking force adjusting device according to an exemplary embodiment of the present disclosure. FIG. 3C is a diagram illustrating a flow of releasing a braking hydraulic pressure in a state in which a failure occurs in a main braking force adjusting device according to an exemplary embodiment of the present disclosure.

Referring to FIG. 3A, when the main braking force adjusting device 100 is in a normal state, the main shut-off valves 212 and 213 may be opened so that the first hydraulic brakes 601 and 602 may receive hydraulic pressure controlled from the main braking force adjusting device 100 through the auxiliary braking force adjusting device 200. When the user operates the brake pedal 300 when the main braking force adjusting device 100 is in a normal state, information such as an adjusting amount and adjusting speed of the brake pedal 300 is transmitted to the main braking force adjusting device 100 through the first stroke transmission line 310, and the main braking force adjusting device 100 may adjust hydraulic pressure based on the received stroke information. When the main braking force adjusting device 100 is in a normal state, the main braking force adjusting device 100 may perform control using the first hydraulic brakes 601 and 602 and the second hydraulic brakes 603 and 604. Here, the main braking force adjusting device 100 may control the first hydraulic brakes 601 and 602 via the auxiliary braking force adjusting device 200. For example, the main braking force adjusting device 100 may supply hydraulic pressure to the first hydraulic brake 601 through the first main hydraulic pressure line 120 and the first redundant hydraulic pressure line 210 of the auxiliary braking force adjusting device 200. In the instant case, the main shut-off valve 212 connecting the first main hydraulic line 120 to the first redundancy hydraulic line 210 may be open. Also, the valve 221 included in the second redundancy hydraulic line 220 and the valve 233 included in the third redundancy hydraulic line 230 may be closed so that hydraulic pressure generated from the main braking force adjusting device 100 may be accurately transmitted to the first hydraulic braking system 601. That is, the main shut-off valve 212 may be opened and the valves of the second redundancy hydraulic line 220 and the third redundancy hydraulic line 230 may be closed so that hydraulic pressure generated from the main braking force adjusting device 100 may be accurately transmitted to the first hydraulic brake 601 through the first main hydraulic line 120 and the first redundancy hydraulic line 210.

A process in which the auxiliary braking force adjusting device 200 supplies and releases hydraulic pressure to the first hydraulic brakes 601 and 602 will be described in detail with reference to FIGS. 3B and 3C.

Referring to FIGS. 3B and 3C, when it is determined that the main braking force adjusting device 100 fails, the main shut-off valves 212 and 213 connected to the main hydraulic line of the main braking force adjusting device 100 may be closed. That is, when the main braking force adjusting device 100 fails, hydraulic connection between the main braking force adjusting device 100 and the first hydraulic brakes 601 and 602 may be cut off. In the instant case, the first hydraulic brakes 601 and 602 may be control braking hydraulic pressure by the auxiliary braking force adjusting device 200. When a failure occurs in the main braking force adjusting device 100 and a user operates the brake pedal 300, information such as the adjusting amount and adjusting speed of the brake pedal 300 may be transmitted to the auxiliary braking force adjusting device 200 through the second stroke transmission line 311, and the auxiliary braking force adjusting device 200 may replace the main braking force adjusting device 100 and may adjust hydraulic pressure based on the received stroke information. When a failure occurs in the main braking force adjusting device 100, the main blocking valves 212 and 213 provided between the main braking force adjusting device 100 and the auxiliary braking force adjusting device 200 may be closed. Accordingly, connection between the main braking force adjusting device 100 and the first hydraulic brakes 601 and 602 may be cut off, and the main braking force adjusting device 100 may no longer control hydraulic pressure of the first hydraulic brakes 601 and 602, and the auxiliary braking force adjusting device 200 may adjust braking force by controlling hydraulic pressure of the first hydraulic brakes 601 and 602.

The auxiliary braking force adjusting device 200 may receive braking oil through a separately provided braking oil supply line 130 and may pressurize the supplied braking oil using a redundant hydraulic motor pump 240. The braking oil pressurized by the hydraulic motor pump 240 may be transmitted to the first hydraulic brakes 601 and 602 through the first redundancy hydraulic lines 210 and 211 and may adjust braking force. The auxiliary braking force adjusting device 200 may control braking hydraulic pressure supplied to the first hydraulic brakes 601 and 602 by opening and closing the valves 221 and 222 included in the second redundancy hydraulic line 220 and the valves 233 and 234 included in the third redundancy hydraulic line 230.

A process in which the auxiliary braking force adjusting device 200 supplies hydraulic pressure to the first hydraulic brakes 601 and 602 will be described with reference to FIG. 3B. The auxiliary braking force adjusting device 200 may open the valve 221 provided in the second redundancy hydraulic line 220, and may transmit braking hydraulic pressure to the first hydraulic brake 601 through the second redundancy hydraulic line 220 and the first redundancy hydraulic line 210. In the instant case, the main shut-off valve 212 connecting the first main hydraulic line 120 and the first redundancy hydraulic line 210 may be closed, and the valve 233 of the third redundancy hydraulic line may be closed. Accordingly, braking hydraulic pressure generated by the auxiliary braking force adjusting device 200 may be accurately transmitted to the first hydraulic brake 601. Also, the auxiliary braking force adjusting device 200 may open the valve 222 provided in the second redundancy hydraulic line 220 and may transmit braking hydraulic pressure to the first hydraulic brake 602 through the second redundancy hydraulic line 220 and the first redundancy hydraulic line 211. In the instant case, the main shut-off valve 213 connecting the first main hydraulic line 121 to the first redundancy hydraulic line 211 may be closed, and the valve 234 of the third redundant hydraulic line may be closed. Accordingly, braking hydraulic pressure generated by the auxiliary braking force adjusting device 200 may be accurately transmitted to the first hydraulic brake 602.

A process in which the auxiliary braking force adjusting device 200 releases hydraulic pressure supplied to the first hydraulic brakes 601 and 602 will be described with reference to FIG. 3C. The auxiliary braking force adjusting device 200 may reduce braking hydraulic pressure supplied to the first hydraulic brakes 601 and 602 to release braking force applied to the first hydraulic brakes 601 and 602. First, the auxiliary braking force adjusting device 200 may close the valve 221 of the second redundancy line may open the valve 233 of the third redundancy line, may allow braking oil supplied to the first hydraulic brake 601 to flow back to a braking oil reservoir tank, lowering braking hydraulic pressure supplied to the first hydraulic brake 601. Similarly, the auxiliary braking force adjusting device 200 may close the valve 222 of the second redundancy line to release braking hydraulic pressure supplied to the first hydraulic brake 602, may open the valve 234 of the third redundancy line, may allow braking oil supplied to the hydraulic brake 602 to flow back to the braking oil reservoir tank, lowering braking hydraulic pressure supplied to the first hydraulic brake 602.

The auxiliary braking force adjusting device 200 may individually adjust hydraulic pressure of the first hydraulic brakes 601 and 602 by adjusting the valves 221, 222, 233, and 234 provided in the second redundancy hydraulic line 220 and the third redundancy hydraulic line 230, 231 and 232 together with the redundancy hydraulic motor pump 240. For example, as illustrated in FIG. 3B, the valves 221, 222, 233, and 234 provided in the second redundancy hydraulic line 220 and the third redundancy hydraulic line 230, 231 and 232 may be controlled by pulse with modulation (PWM) in a process of supplying hydraulic pressure to the first hydraulic brakes 601 and 602, and the amount of pressure increase or pressure reduction may be adjusted through timing control of the valve. That is, by individually controlling the valves 221, 222, 233, and 234 provided in the second redundancy hydraulic line 220 and the third redundancy hydraulic line 230, 231, and 232, the amount of pressure increase or pressure reduction may be adjusted. Accordingly, when wheel slip occurs in the left wheel provided with the first hydraulic brakes 601 and 602, the auxiliary braking force adjusting device 200 may reduce driving force by applying braking hydraulic pressure to the first hydraulic brake 602 provided on the left wheel so that occurrence of wheel slip may be reduced and performance of travelling straight of the vehicle may improve.

Referring back to FIG. 1, the auxiliary braking force adjusting device 200 may be connected to the first hydraulic brakes 601 and 602 through the hydraulic lines 210 and 211, but may not be connected to the second hydraulic brake 603 and 604 through the hydraulic line so that braking hydraulic pressure of the second hydraulic brakes 603 and 604 may not be adjusted. Accordingly, when braking force exceeding braking force generated through the first hydraulic brakes 601 and 602 is required, braking force may not be supplemented through the second hydraulic brakes 603 and 604 and additional means for supplementing braking force may be necessary. The auxiliary braking force adjusting device 200 may be electrically connected to electric parking brakes (EPB) 701 and 702 provided on wheels to which the second hydraulic brakes 603 and 604 are attached, and braking force may be generated by controlling the EPBs 701 and 702. The auxiliary braking force adjusting device 200 may be connected to the right side of the rear wheel and the first EPB control line 250, and may be connected to the left side of the rear wheel and the second EPB control line 251. The auxiliary braking force adjusting device 200 may control the first EPB 701 and the second EPB 702 provided in the rear wheel through the first EPB control line 250 and the second EPB control line 251, respectively, and may generate braking force.

Figure 4A:
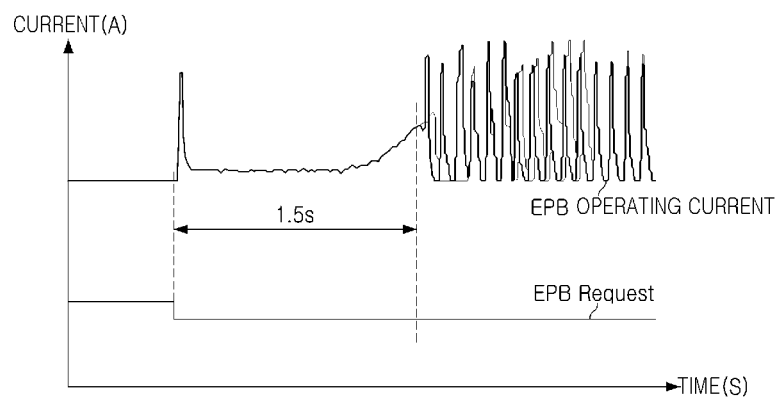
FIG. 4A is a graph illustrating an example of an EPB operation according to a comparative example.
Figure 4B:
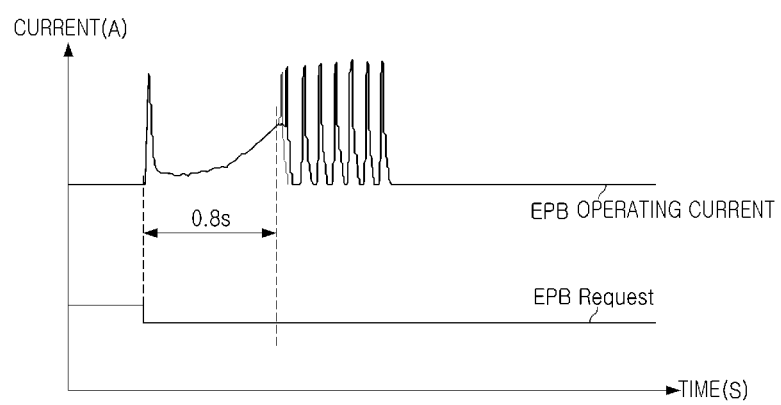
FIG. 4B is a graph illustrating an example of an EPB operation according to an exemplary embodiment of the present disclosure.

Meanwhile, the EPBs 701 and 702 may include an electric motor, and may generate braking force by operating the electric motor in response to an electric signal. Accordingly, differently from the hydraulic brakes 601, 602, 603, and 604, which generate braking force immediately according to hydraulic pressure, due to the time in which the EPBs 701 and 702 receives the braking signal and the electric motor is driven, a braking delay in which a time interval occurs between a braking start signal and braking force generation. FIG. 4A is a graph illustrating an example of an EPB operation according to a comparative example, and FIG. 4B is a graph illustrating an example of an EPB operation according to an exemplary embodiment of the present disclosure. Referring to FIG. 4A, after the EPB braking signal is generated, a predetermined delay time (e.g., 1.5 seconds (sec)) may be consumed until the time point when an operating current of the EPB is generated, that is, braking force starts to be generated.

According to an exemplary embodiment of the present disclosure, to shorten the braking force generation time of the EPB, the vehicle may be driven while the EPB motor is operated for a predetermined time period. Here, driving in a state in which the EPB motor is operated for a predetermined time period may be referred to as a first EPB redundancy mode. The time in which the EPB motor is operated in advance and the time taking from the time at which the EPB operating to the time at which braking force starts to be generated may be as in Table below.

TABLE 1

| EPB pre-operating time (ms, millisecond) | Time required from EPB operation to generating braking force (s, second) |
|---|---|
| 0 ms | 1.5 s |
| 300 ms | 1.2 s |
| 400 ms | 1.1 s |
| 500 ms | 1.0 s |

As the pre-operating time of the EPB is longer, the time required between the operation time of the EPB and the time at which the braking force starts to be generated may decrease. However, excessive pre-operating time may generate braking force even in a state in which the EPB braking control is not performed, drag may occur in the wheels provided with the EPBs 701 and 702, which may adversely affect ride quality of the vehicle, and may also adversely affect fuel efficiency. Accordingly, the pre-operating time of the EPB may be between 300 ms and 500 ms to obtain rapid generation of braking force of the EPB and to prevent deterioration of ride quality and fuel efficiency of the vehicle. However, the pre-operating time of the EPB is not limited thereto, and may be varied depending on the type of vehicle and tire wheel specifications.

Here, in relation to the application of the pre-operating time of the EPB, the brake 10 according to various exemplary embodiments of the present disclosure may have the first EPB redundancy mode. In the first EPB redundancy mode, the EPB may be operated by collectively applying a predetermined operation time, regardless of the state of the vehicle, when the vehicle performs braking control by the auxiliary braking force adjusting device 200. The first EPB redundancy mode may be applied when the autonomous driving control unit 400 of the vehicle is not provided or in an inactive state.

The brake 10 according to various exemplary embodiments of the present disclosure may further include a second EPB redundancy mode. In the second EPB redundancy mode, when the vehicle performs braking control by the auxiliary braking force adjusting device, the risk level may be determined according to the driving state of the operating vehicle, and a pre-operating time may be differently applied according to the risk level. Here, the risk level of the vehicle may be determined by the autonomous driving control unit 400.

Recently, there have been active interests in autonomous vehicles and technology development thereof. As for autonomous driving, how safely a device for preparing for an unexpected accident is secured may be an important factor. The autonomous driving stage may be divided into level 1 to 5, and from the level 3, limited autonomous driving may be provided, an alarm may be provided to the driver in case of malfunctioning, and control may be transferred to a driver in case of an emergency. However, a user driving at level 3 may not be able to immediately respond to an emergency situation of the vehicle as the user may neglect to keep an eye on the front. Also, even before the transfer of the control right to a user, the vehicle control unit may have to select the best driving method and may need to promote safety of the vehicle and the user. It may be necessary to perform appropriate deceleration even in the event of a brake failure. The braking system 10 according to various exemplary embodiments of the present disclosure may control braking force using the auxiliary braking force adjusting device 200 even when the main braking force adjusting device 100 does not operate normally, facilitating safer autonomous driving.

Also, the braking system 10 according to an exemplary embodiment of the present disclosure may further include a display unit, and may send a transition demand (TD) request of requesting a user to control the vehicle again when a failure of the main braking force adjusting device 100 occurs during autonomous driving. In the instant case, when the user responds to the transition demand request (for example, by manipulating a brake pedal), the vehicle may stop autonomous driving and driving may be continued by the user. Furthermore, when the user does not respond to the transition demand request, the autonomous driving control unit 400 may perform braking control through the auxiliary braking force adjusting device 200 for safety of the user and the vehicle. The auxiliary braking force adjusting device 200 may perform braking using the first hydraulic brakes 601 and 602 but also the first EPB 701 and the second EPB 702 according to the deceleration amount transmitted from the autonomous driving control unit 400 so that driving may be maintained without much difference from the autonomous driving control unit 400 controlling braking of the first hydraulic brakes 601 and 602 and the second hydraulic brakes 603 and 604 through the auxiliary braking force adjusting device 200.

The autonomous driving control unit 400 may detect the driving situation of the vehicle or the situation of a driving road, and may control the vehicle to accelerate, decelerate, and stop using the main braking force adjusting device 100 or the auxiliary braking force adjusting device 200. The autonomous driving control unit 400 may be a highway driving pilot (HDP), but an exemplary embodiment thereof is not limited thereto, and the autonomous driving control unit 400 may be a device configured for controlling a vehicle without a driver's control. The autonomous driving control unit 400 may determine the risk level of the operating vehicle according to the request from the auxiliary braking force adjusting device 200, and may transmit the determined risk level to the auxiliary braking force adjusting device 200.

The braking system 10 may further include a display unit 500. The display unit 500 may provide information on the current braking control state to the driver. The display unit 500 may include a visual display unit and an auditory display unit. The visual display unit may include a cluster including a display of the vehicle. The auditory display unit may include an audio device. For example, when it is determined that the main braking force adjusting device 100 of the vehicle has a failure, it may be notified that the vehicle is currently travelling by the fact that the main braking force adjusting device 100 is malfunctioning and the auxiliary braking force adjusting device 200, and a subsequent inspection may be induced. Furthermore, when the vehicle is performing autonomous driving, it may request the driver to control the vehicle (e.g., transition demand (TD) request) through the display unit 500. Here, when the vehicle is performing autonomous driving, when the driver operates the brake pedal 300 in response to a request, braking control may be performed through the auxiliary braking force adjusting device 200 according to the driver's manipulation, and when there is no response, the autonomous driving control unit may perform braking control through the auxiliary braking force adjusting device 200.

Components of the braking system 10 may be connected to each other by wire or wirelessly to exchange information. For example, the data may be exchanged using communication means such as Ethernet, media oriented systems transport (MOST), Flexray, controller area network (CAN), local interconnect network (LIN), Internet, LTE, 5G, Wi-Fi, Bluetooth, near field communication (NFC), Zigbee, radio frequency (RF).

Here, the main braking force adjusting device 100 and the auxiliary braking force adjusting device 200 may be connected to each other through an additional wire in addition to the common communication means provided in the vehicle described above. For example, the main braking force adjusting device 100 and the auxiliary braking force adjusting device 200 may be connected to each other through CAN and two separate wiring lines. The main braking force adjusting device 100 may transmit a constant signal to the auxiliary braking force adjusting device 200 through CAN, and the auxiliary braking force adjusting device 200 may identify whether the main braking force adjusting device 100 is malfunctioning through a change in the received signal. Also, the main braking force adjusting device 100 may apply a constant voltage to the auxiliary braking force adjusting device 200 through wiring, and the auxiliary braking force adjusting device 200 may determine that the main braking force adjusting device 100 is malfunctioning when the received voltage falls below a predetermined level. Here, a communication line for identifying whether the main braking force adjusting device 100 and the auxiliary braking force adjusting device 200 is faulty may be referred to as a first failure confirmation line 111, and an additional wiring connection line for applying a constant voltage from the main braking force control device 100 may be referred to as a second failure confirmation line 110. Through the double-connected failure confirmation lines 110 and 111, even when one of the failure confirmation lines does not operate normally, whether the main braking force adjusting device 100 has a failure may be more reliably determined.

Figure 5:
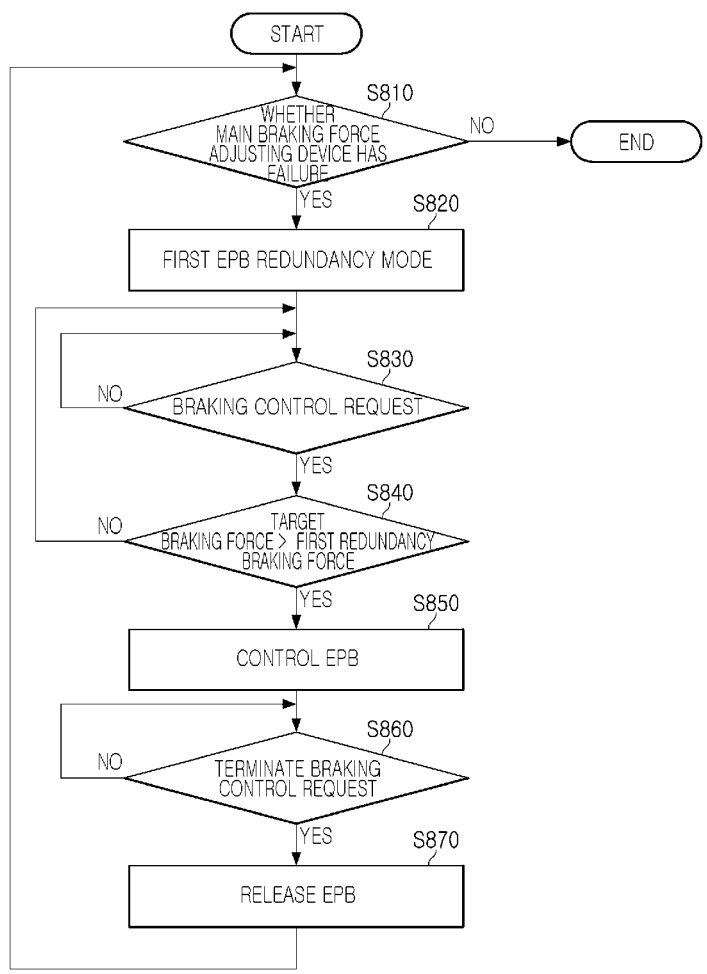
FIG. 5 is a flowchart illustrating a braking method according to an exemplary embodiment of the present disclosure.

Thereafter, a braking method according to an exemplary embodiment will be described with reference to FIG. 5. FIG. 5 is a flowchart illustrating a braking method according to an exemplary embodiment of the present disclosure.

Referring to FIGS. 5 and 1 together, the auxiliary braking force adjusting device 200 may determine whether the main braking force adjusting device 100 has a failure through the first failure confirmation line 111 and the second failure confirmation line 110 (S810). Here, even when the failure of the main braking force control device 100 is identified only through one of the first failure confirmation line 111 or the second failure confirmation line 110, the auxiliary braking force adjusting device 200 may determine that the main braking force adjusting device 100 has a failure.

When it is confirmed that a failure has occurred in the main braking force adjusting device 100, the auxiliary braking force adjusting device 200 may control the braking of the vehicle, and the vehicle may be driven in the first EPB redundancy mode (S820). Here, the first EPB redundancy mode may be a driving mode in which the vehicle may travel while the EPB is operated in advance for a predetermined time period (e.g., 500 ms) to improve the response delay of the EPB. The operating time of the EPB may be determine in consideration of the occurrence of drag according to the type of vehicle and the type of tire wheel so that the responsiveness of the EPB may improve and ride comfort and fuel efficiency may not deteriorate.

While driving in the first EPB redundancy mode, whether the vehicle has a braking request may be continuously or repeatedly checked (S830). Here, the braking request to the vehicle may be confirmed through stroke information transmitted to the auxiliary braking force adjusting device 200 through the second stroke transmission line 311 according to the user's manipulation of the brake pedal 300. Furthermore, when the vehicle is performing autonomous driving, the request may be confirmed through a deceleration signal including the deceleration information determined based on the driving condition of the vehicle and the road condition by the autonomous driving control unit 400, which may be transmitted to the auxiliary braking force adjusting device 200 through the second autonomous driving control line 411.

When a braking control request is generated, the target braking force and the first redundancy braking force may be compared (S840). Here, the target braking force may be required to generate the deceleration amount required by the braking control request, and the first redundant braking force may be generated by the auxiliary braking force adjusting device 200 using the first hydraulic brakes 601 and 602. When the target braking force may be satisfied with the first redundancy braking force, the first hydraulic brakes 601 and 602 may be controlled by the auxiliary braking force adjusting device 200, the vehicle continues to travel in the first EPB redundancy mode, and it may be identified whether there is a braking control request by returning to operation S830.

When the target braking force may not be satisfied with the first redundant braking force, the auxiliary braking force adjusting device 200 may generate additional braking force using the electrically connected EPB (S850). Here, because the vehicle is traveling in the first EPB redundancy mode in which the EPB has been previously operated for a predetermined time period, braking may be performed by reducing the delay in generating the braking force of the EPB.

Here, the case in which the target braking force may not be satisfied may indicate that target braking force required to satisfy the target deceleration amount according to the user's manipulation of the brake pedal 300 or the target reduction received from the autonomous driving control unit 400 exceeds the braking force generated by the first hydraulic brakes 601 and 602. In a state in which the main braking force adjusting device 100 operates normally, braking may be performed using the first hydraulic brakes 601 and 602 and the second hydraulic brakes 603 and 604, but the auxiliary braking force adjusting device 200 may not be connected to the second hydraulic brakes 603 and 604. Accordingly, the first redundancy braking force generated through the first hydraulic brakes 601 and 602 may be less than the target braking force, and a means for generating a braking force to the wheel provided with the second hydraulic brakes 603 and 604 not connected to the auxiliary braking force adjusting device 200 to compensate for the insufficient braking force.

It may be confirmed whether the braking control request is terminated, and the EPB control may be continued until the braking control request is terminated (S860). Here, whether the braking control request is terminated may be confirmed by releasing the manipulation of the brake pedal 300 by the user or by the termination of the deceleration signal of the autonomous driving control unit 400 as further deceleration is not necessary.

When the braking control request is not terminated, the EPB may be completely released (S870). After the EPB is completely released, it may be checked whether the main braking force adjusting device 100 has a failure, and in case of failure, the vehicle may travel again in the first EPB redundancy mode. Here, the entering the first EPB redundancy mode in which the EPB is operated for a predetermined time period after the EPB is completely released may be performed because a precise position of the EPB pad may not be recognized as a stroke sensor is not provided in a general EPB. By constantly applying the pre-operating time in a state in which the EPB is completely released, the position of the EPB pad may be constantly maintained in a target position. That is, when the EPB is provided with a stroke sensor and the position of the pad may be accurately determined, by determining a EPB pad position value instead of the pre-operating time, the EPB pad may be placed in a predetermined position without completely releasing the EPB so that an effect of preventing the delay in braking force generation without generating drag as in the exemplary embodiment of the present disclosure may be obtained. The exemplary embodiment has been described based on an EPB without a stroke sensor, but an exemplary embodiment thereof is not limited thereto, and various methods for constantly positioning the EPB pad may be applied.

According to the braking method according to an exemplary embodiment of the present disclosure, the user may control braking force of the vehicle using the auxiliary braking force adjusting device 200 even in a situation in which a failure occurs in the main braking force adjusting device 100, and the vehicle may stably maintain a travelling state.

Figure 6:
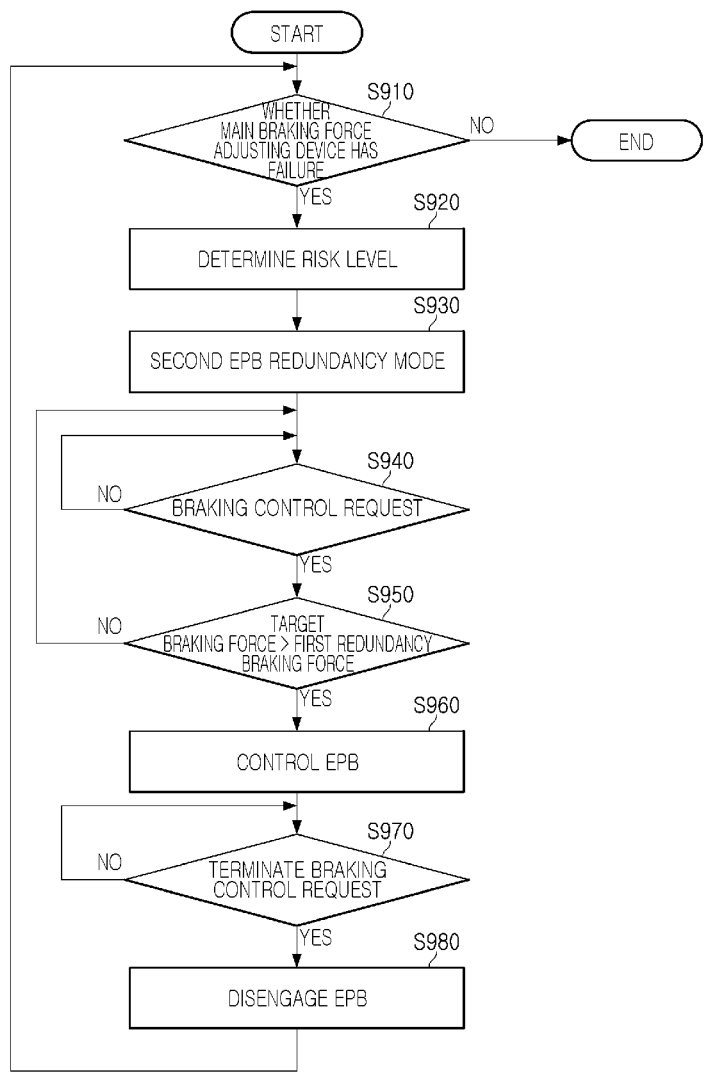
FIG. 6 is a flowchart illustrating a braking method according to another exemplary embodiment of the present disclosure.

FIG. 6 is a flowchart illustrating a braking method according to another exemplary embodiment of the present disclosure.

The auxiliary braking force adjusting device 200 may identify whether the main braking force adjusting device 100 has a failure through the first failure confirmation line 111 and the second failure confirmation line 110 (S910). Here, the auxiliary braking force adjusting device 200 may determine that a failure has occurred in the main braking force adjusting device 100 when it is determined that a failure has occurred in the main braking force adjusting device 100 only through one of the first failure confirmation line 111 or the second failure confirmation line 110.

Figure 7:
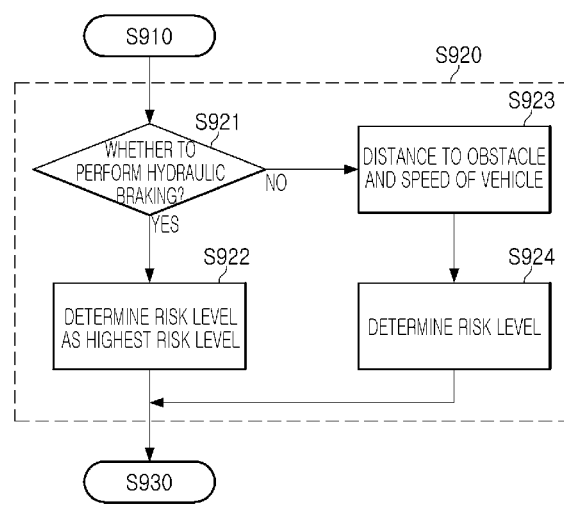
FIG. 7 is a flowchart illustrating a risk level according to another exemplary embodiment of the present disclosure.

When it is confirmed that a failure has occurred in the main braking force adjusting device 100, the auxiliary braking force adjusting device 200 may control braking. In the instant case, the auxiliary braking force adjusting device 200 may determine the risk level through the autonomous driving control unit 400 (S920). FIG. 7 is a flowchart illustrating a risk level according to another exemplary embodiment of the present disclosure. Referring to FIG. 7, the autonomous driving control unit 400 may determine whether the auxiliary braking force adjusting device 200 performs hydraulically braking (S921). When the auxiliary braking force adjusting device 200 is performing hydraulic braking using the first hydraulic brakes 601 and 602, it may be determined as a dangerous situation in which additional braking force may be required at any time and the risk level may be determined as the highest risk level (S922). For example, when the risk level may be determined amount stages 1 to 3, and when hydraulic braking is applied to the first hydraulic device in the travelling vehicle, the risk level may be determined as 3.

When the auxiliary braking force adjusting device 200 is not performing hydraulic braking, the autonomous driving control unit 400 may receive a distance to an obstacle and the speed of the vehicle through a sensor attached to the vehicle (S923). Also, the autonomous driving control unit 400 may determine the risk level based on the received distance to the obstacle and the speed of the vehicle (S924). For example, the autonomous driving control unit 400 may determine the risk level to be higher as the distance between the vehicle and the obstacle is shorter and the speed of the vehicle is higher.

Also, as in Table 2, the autonomous driving control unit 400 may determine the risk level through a predetermined and stored table.

TABLE 2

| | | S: Distance (m) | | | |
|---|---|---|---|---|---|
| Risk level | | 0-S1 | S1-S2 | S2-S3 | S3~ |
| V: Vehicle speed (km/h) | 0-V1 | 2 | 1 | 1 | 1 |
| | V1-V2 | 2 | 2 | 1 | 1 |
| | V2-V3 | 3 | 2 | 2 | 1 |
| | V3- | 3 | 3 | 2 | 2 |

Here, V1 may be 30 km/h, V2 may be 40 km/h, V3 may be 60 km/h, S1 may be 3 m (meter), S2 may be 5 m, and S3 may be 10 m. However, an exemplary embodiment thereof is not limited thereto, and the speed and distance values may be varied according to the type of vehicle and the performance of the brake. Also, the risk level may also be subdivided into three or more risk levels.

When the risk level is determined, the vehicle may travel in the second EPB redundancy mode (S930). Here, in the second EPB redundancy mode, the pre-operating time of the EPB may be differently determined and applied according to the risk level. For example, as for the pre-operating time of the EPB, 400 ms may be applied at risk level 1, 600 ms may be applied at risk level 2, and 1200 ms may be applied at risk level 3, in the case of the risk level 3, the pre-operating time may be applied without considering whether drag is generated due to the pre-operating of the EPB to generate immediate braking force rather than in terms of ride comfort or fuel efficiency of the vehicle.

It may be continuously or repeatedly identified whether the vehicle has a braking request while travelling in the second EPB redundancy mode (S940). Here, the braking request to the vehicle may be confirmed through stroke information transmitted to the auxiliary braking force adjusting device 200 through the second stroke transmission line 311 according to the user's manipulation of the brake pedal 300. Furthermore, when the vehicle is performing autonomous driving, the request may be identified through a deceleration signal including the deceleration amount information determined based on the driving condition of the vehicle and the road condition by the autonomous driving control unit 400, transmitted to the auxiliary braking force adjusting device 200 through the second autonomous driving control line 411.

When a braking control request occurs (e.g., when a deceleration signal is received from the autonomous driving control unit 400), the target braking force and the first redundant braking force may be compared (S950). Here, the target braking force may be braking force required to generate the deceleration required by the braking control request, and the first redundant braking force may be generated by the auxiliary braking force adjusting device 200 using the first hydraulic brakes 601 and 602. When the target braking force may be satisfied with the first redundancy braking force, the first hydraulic brakes 601 and 602 may be controlled by the auxiliary braking force adjusting device 200, the vehicle may continue to travel in the second EPB redundancy mode, and it may be identified whether there is a brake control request by returning to operation S940.

When the target braking force may not be satisfied with the first redundant braking force, the auxiliary braking force adjusting device 200 may generate additional braking force using the electrically connected EPB (S960). Here, because the vehicle was traveling in the second EPB redundancy mode in which the EPB has been previously operated for a predetermined time period according to the risk level, the braking may be performed by reducing the delay in operation of the EPB.

It may be identified whether the braking control request is terminated, and the EPB control may be continued until the braking control request is terminated (S970). Here, whether the braking control request is terminated may be confirmed by releasing the operation of the brake pedal 300 by the user or by the termination of the deceleration signal of the autonomous driving control unit 400 as further deceleration is not necessary.

When the braking control request ends, the EPB may be completely released (S980). After the EPB is completely released, it may be identified whether the main braking force adjusting device 100 has a failure, and when there is a failure, the risk level may be determined again, and the driving may be continued in the second EPB redundancy mode according to the determined result. Here, the entering the second EPB redundancy mode by operating the EPB for a predetermined time period after the EPB is completely released may be performed to control the EPB uniformly even when the precise position of the EPB pad is not recognized because the EPB is not provided with a stroke sensor. In other words, by constantly applying the pre-operating time in the state in which the EPB is completely released, the position of the EPB pad may be constantly maintained. Accordingly, when the stroke sensor is provided in the EPB and the position of the pad may be accurately identified and determined, without completely releasing the EPB, by determining the EPB pad position value, the same effect as in the exemplary embodiment of the present disclosure may be obtained. Generally, as commercially available EPBs may not have a stroke sensor, the description has been based on a method of applying the pre-operating time again after completely releasing the EPB, but an exemplary embodiment thereof is not limited thereto, and various methods for constantly controlling the EPB may be applied.

According to the braking method according to another exemplary embodiment of the present disclosure, the user or the autonomous driving control unit 400 may control the braking force of the vehicle using the auxiliary braking force adjusting device 200 even in a situation in which a failure occurs in the main braking force adjusting device 100, and the vehicle may maintain a stable driving state.

The methods according to an exemplary embodiment of the present disclosure may be implemented in a form of program instructions executed by various computer means and written in a computer-readable medium. The computer-readable medium may include program instructions, data files, data structures, and the like, alone or in combination. The program instructions written on the computer readable medium may be specially designed and configured for the present disclosure, or may be known and available to those skilled in the art of computer software.

Examples of computer-readable media may include hardware devices specially configured to store and carry out program instructions, such as ROM, RAM, flash memory, and the like. Examples of program instructions may include machine language codes such as those generated by a compiler, and also high-level language codes executed by a computer using an interpreter. The hardware device described above may be configured to operate as at least one software module to perform the operations of the present disclosure, and vice versa.

The braking system and the braking method using the same according to various exemplary embodiments of the present disclosure may directly control hydraulic pressure of one of the front wheels or the rear wheels using the auxiliary braking force adjusting device even when the failure occurs in the main braking force adjusting device.

Also, even when a failure occurs in the main braking force adjusting device, the braking may be controlled while maintaining the driving condition using the auxiliary braking force adjusting device.

Furthermore, when braking force exceeding that of the hydraulic brake of one of the front wheel or the rear wheel is required, the auxiliary braking force adjusting device may compensate for insufficient braking force using the EPB.

Also, the auxiliary braking force adjusting device may improve the speed at which the braking force is generated in the EPB by allowing the vehicle to travel in a state in which the EPB is operated in advance for a predetermined time period.

In various exemplary embodiments of the present disclosure, the main braking force adjusting device 100 and the auxiliary braking force adjusting device 200 may include a controller.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A braking system, comprising:
   a hydraulic brake including a first hydraulic brake provided on one of a front wheel and a rear wheel of a vehicle and a second hydraulic brake provided on another of the front wheel and the rear wheel of the vehicle;
   a main braking force adjusting device configured to control braking hydraulic pressure supplied to the first hydraulic brake and the second hydraulic brake; and
   an auxiliary braking force adjusting device configured to directly control braking hydraulic pressure of the first hydraulic brake when a failure occurs in the main braking force adjusting device,
   wherein the first hydraulic brake is connected to the main braking force adjusting device via the auxiliary braking force adjusting device.

2. The braking system of claim 1, wherein the auxiliary braking force adjusting device is configured to electrically control braking of a wheel provided with the second hydraulic brake.

3. The braking system of claim 1, wherein the auxiliary braking force adjusting device is configured to electrically control braking of a wheel provided with the second hydraulic brake using an electronic parking brake (EPB).

4. The braking system of claim 3,
   wherein the auxiliary braking force adjusting device is configured to control the EPB through a redundancy mode, and
   wherein the redundancy mode is a mode in which the vehicle travels while maintaining the EPB in a pre-operating state for a predetermined time period.

5. The braking system of claim 1, wherein the auxiliary braking force adjusting device includes:
   a first redundancy hydraulic line connected to the first hydraulic brake; and
   a brake oil supply line supplied with brake oil.

6. The braking system of claim 5, wherein the auxiliary braking force adjusting device further includes a redundant hydraulic motor pump configured to adjust the braking hydraulic pressure supplied to the first redundancy hydraulic line.

7. The braking system of claim 5,
   wherein the first hydraulic brake includes a hydraulic brake of the left wheel and a hydraulic brake of the right wheel, and
   wherein the auxiliary braking force adjusting device is configured to individually adjust hydraulic pressure of the hydraulic brake of the left wheel and the hydraulic brake of the right wheel.

8. The braking system of claim 5,
   wherein the auxiliary braking force adjusting device further includes a main hydraulic line connected to the main braking force adjusting device, and
   wherein the auxiliary braking force adjusting device includes a main shut-off valve configured to connect or block braking hydraulic pressure transferred from the main hydraulic line.

9. The braking system of claim 1, wherein the main braking force adjusting device and the auxiliary braking force adjusting device are connected to each other via a first failure confirmation line, which is a communication line for identifying whether the braking force adjusting device operates normally, and a second failure confirmation line, which is a line directly connecting the main braking force adjusting device to the auxiliary braking force adjusting device and applying a predetermined voltage from the main braking force adjusting device to the auxiliary braking force adjusting device.

10. The braking system of claim 9, wherein braking is controlled through the auxiliary braking force adjusting device when the failure of the main braking force adjusting device is confirmed through one of the first and second failure confirmation lines.

11. A braking method, comprising:
    determining whether a failure occurs in a main braking force adjusting device configured to control braking hydraulic pressure of a first hydraulic brake provided on one of a front wheel and a rear wheel of a vehicle and a second hydraulic brake provided on another of the front wheel and the rear wheel of the vehicle; and
    performing a redundancy braking control of directly controlling braking hydraulic pressure of the first hydraulic brake through an auxiliary braking force adjusting device when the failure occurs in the main braking force adjusting device,
    wherein the first hydraulic brake is connected to the main braking force adjusting device via the auxiliary braking force adjusting device.

12. The braking method of claim 11,
    wherein the performing the redundancy braking control further includes electrically controlling braking of a wheel provided with the second hydraulic brake by the auxiliary braking force adjusting device when a target braking force exceeds a first redundant braking force, and
    wherein the target braking force is required to decelerate the vehicle at a predetermined deceleration amount, and the first redundant braking force is generated by the auxiliary braking force adjusting device using the first hydraulic brake.

13. The braking method of claim 12, wherein the performing the redundancy braking control includes maintaining the vehicle to travel while directly controlling the braking hydraulic pressure of the first hydraulic brake through the auxiliary braking force adjusting device, electrically controlling braking of a wheel provided with the second hydraulic brake, and controlling braking force of the vehicle even when the failure occurs in the main braking force adjusting device.

14. The braking method of claim 12, wherein the electrically controlling braking of the wheel provided with the second hydraulic brake includes performing the braking by the auxiliary braking force adjusting device using an electronic parking brake (EPB) of the wheel provided with the second hydraulic brake.

15. The braking method of claim 14,
wherein the electrically controlling braking of the wheel provided with the second hydraulic brake includes a first EPB redundancy mode in which the braking is performed using the EPB, and
wherein, in the first EPB redundancy mode, the vehicle travels while maintaining the EPB in a pre-operating state for a predetermined time period.

16. The braking method of claim 12, wherein the electrically controlling braking of the wheel provided with the second hydraulic brake includes:
determining a risk level through an autonomous driving control unit; and
performing a second EPB redundancy mode for controlling braking using the EPB according to the risk level.

17. The braking method of claim 16, wherein the performing the second EPB redundancy mode according to the risk level includes applying a pre-operating time of the EPB differently according to the risk level.

18. The braking method of claim 16, wherein the determining the risk level includes determining the risk level based on at least one of whether controlling hydraulic braking is performed, a distance to an obstacle, and a speed of the vehicle.

19. The braking method of claim 16, wherein the determining the risk level includes determining the risk level using a table generated based on a distance to an obstacle and a speed of the vehicle.

20. The braking method of claim 11, wherein the determining whether a failure occurs in the main braking force adjusting device includes:
determining that the failure has occurred by the main braking force adjusting device when the failure of the main braking force adjusting device is confirmed through at least one of a first failure confirmation line and a second failure confirmation line,
wherein the first failure confirmation line is a communication line configured to identify whether the main braking force adjusting device is operating normally, and the second failure confirmation line is a line through which a predetermined voltage is applied from the main braking force adjusting device to the auxiliary braking force adjusting device.

21. A braking method, comprising:
determining whether a failure occurs in a main braking force adjusting device configured to control a first brake provided on one of front and rear wheels of a vehicle and a second brake provided on another of the front and rear wheels of the vehicle; and
travelling the vehicle while controlling braking by an auxiliary braking force adjusting device using an electronic brake of a wheel provided with at least a second brake when the failure occurs in the main braking force adjusting device,
wherein the travelling while controlling the braking using the electronic brake includes travelling the vehicle in a state in which the electronic brake pre-operates for a predetermined time period.

22. The braking method of claim 21, wherein the electronic brake is an electronic parking brake (EPB).

* * * * *